United States Patent [19]

Willemsen

[11] 4,011,038

[45] Mar. 8, 1977

[54] PLATE PROVIDED WITH APERTURES SEPARATED FROM EACH OTHER BY SEPARATING RIBS FOR AN INSTALLATION FOR THE MANUFACTURE OF STICKS FROM DOUGH MATERIAL

[76] Inventor: Willem Hendrik Willemsen, 83, Westervalge, Warffum, Netherlands

[22] Filed: Apr. 15, 1976

[21] Appl. No.: 677,483

[30] Foreign Application Priority Data

Feb. 2, 1976 Netherlands .................. 7601006

[52] U.S. Cl. .................. 425/302 R; 83/425.3; 425/289; 425/299; 425/376 R; 425/464

[51] Int. Cl.² .................. B29C 23/00; B29F 3/00

[58] Field of Search ...... 83/425.3; 425/376, 302 R, 425/464, 461, 300, 289, 299

[56] References Cited
UNITED STATES PATENTS

| | | | |
|---|---|---|---|
| 422,039 | 2/1890 | Ruger | 425/299 |
| 1,496,917 | 6/1924 | Baerenfaenger | 83/425.3 |
| 1,709,912 | 4/1929 | Johnston | 83/425.3 X |
| 1,735,702 | 11/1929 | Williamson | 83/425.3 X |
| 1,748,997 | 3/1930 | Rentos | 83/425.3 X |
| 2,713,313 | 7/1955 | Femina | 425/461 |
| 3,346,916 | 10/1967 | Elbert et al. | 425/464 |

*Primary Examiner*—Robert L. Spicer, Jr.
*Attorney, Agent, or Firm*—Karl W. Flocks

[57] ABSTRACT

A plate for a device for the manufacture of so-called potato sticks from dough like material, said plate being provided with apertures separated from one another by separating ribs. In order to prevent that the sticks manufactured by said plate will not adhere to one another said separating ribs being provided at at least two opposite sides with slots or recesses by means of which ridges are formed on the manufactured sticks, which prevent that the sticks adhere to one another with large surfaces.

6 Claims, 5 Drawing Figures

PLATE PROVIDED WITH APERTURES SEPARATED FROM EACH OTHER BY SEPARATING RIBS FOR AN INSTALLATION FOR THE MANUFACTURE OF STICKS FROM DOUGH MATERIAL

The invention relates to a plate, provided with apertures separated from each other by separating ribs, which plate is provided at the end of a tank, in which means are provided for pressing the dough material intermittently through the apertures of the plate, under said plate means being provided for cutting off the dough material pressed through the plate.

Installations of this type for the manufacture of sticks from dough material, which consists of potato-flour, a liquid and additives such as white of egg, which after baking in oil and/or fat provide so-called potato-chips, are generally known in several embodiments. In these known installations, the dough material is pressed through the apertures of the plate in strip-shape, the longitudinal direction of said apertures being either at a right angle to the plate or parallel to the under surface of the plate. The sticks manufactured with all these known installations all have flat surfaces. This presents the disadvantage that the sticks, after being cut off by a cutting device, come to lie on top of each other in a receiving tank, so that they adhere to each other. The result thereof is that during the baking in the oil and/or the fat the sticks adhering to each other will not come into touch all around with the hot oil or the hot moltent fat, so that they are baked irregularly and adhere firmly to each other after the baking.

This disadvantage is avoided with the installation according to the present invention, in that in at least two opposite walls of the separating ribs of the apertures slots or recesses are provided, which extend themselves at least over apart of the height of these limiting walls until the under surface of the plate. Because of the slots in the walls of the separating ribs, ridges are formed on the manufactured sticks, so that it is obtained that the surfaces provided with said ridges of the manufactured sticks can only with said ridges come into contact with the surfaces of other sticks.

With a plate provided with apertures, in which the separating ribs are tapering from the top side to the under side of the plate and in which between said separating ribs oblong apertures are provided with a length and a width corresponding to the length and the width of the sticks to be made, the depth of the slots or recesses may become greater from their top side to their under side. Thus an equal filling and compressing of the dough material in these slots is obtained.

In order not to weaken the separating ribs too much at the place of the slots, the slots provided at both sides of each separating rib are preferably displaced with respect to each other.

A favourable embodiment of the plate provided with apertures is characterized in that the slots or recesses have a cross section which is limited by a curved plane. Thus, the ridges of the manufactured sticks have a curved surface, so that only with a small surface part do they come into touch with a surface of other sticks.

The invention will be explained hereinafter with reference to the drawing, in which by means of example an embodiment is shown of a plate provided with apertues and of a part of an installation, in which this plate is used, for the manufacture of sticks from dough material.

Figure 1:
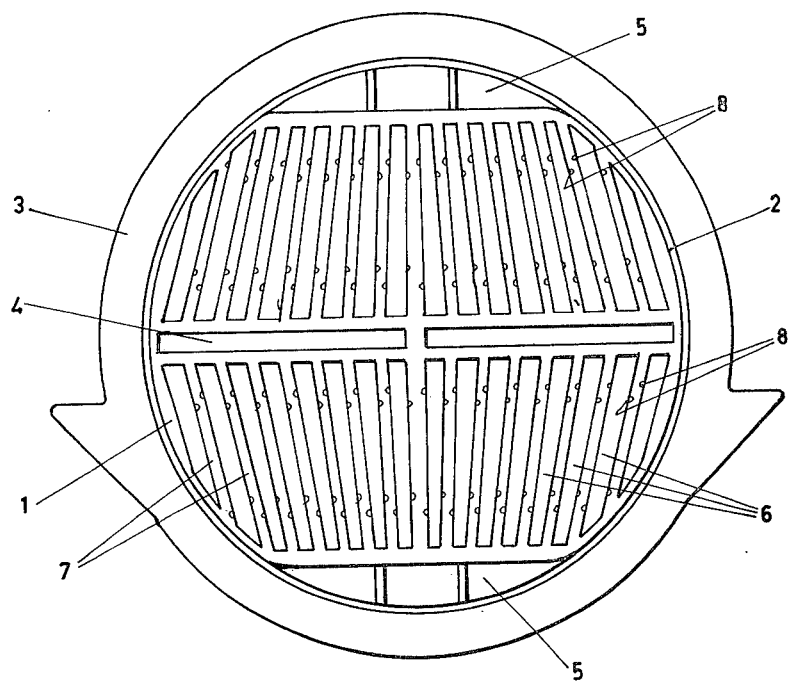
FIG. 1 shows a view from below of the plate provided with apertures.
Figure 2:
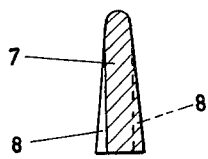
FIG. 2 shows a view from below, at an enlarged scale, of a part of the plate according to FIG. 1.
Figure 3:
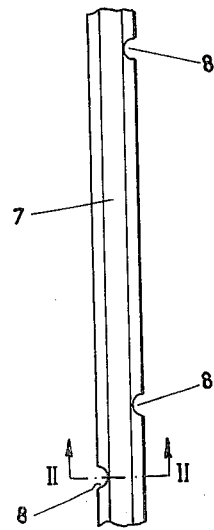
FIG. 3 shows a cross section of a separating rib of the plate along the line III—III in FIG. 2.
Figure 4:
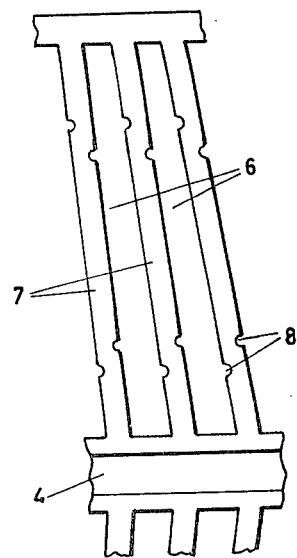
FIG. 4 shows, at an enlarged scale, a top view of a separating rib.

The plate 1 provided with apertures, which is shown in the drawing, has a cylindrical wall 2 with a projecting collar 3. In the cylindrical wall is provided a reinforcement strip 4, which subdivides the plate into two parts. The cylindrical wall 2 has at two opposite places a thickened part 5, of which the inner wall is provided so, that the distance from the inner wall of each thickened part to the reinforcement strip, which extends itself in the same direction as the inner walls of the thickened parts, equals the length of the shortest sticks made from dough material, of which the manufacturing process will be discussed hereinafter.

Each part formed by the strip 4 of the plate 1 is provided with a number of slot-shaped apertures 6, which are spearated from each other by separating ribs 7. Said separating ribs extend themselves increasingly obliquely from the thickened parts 5 of the plate 1 to the opposite walls of the strip 4, so that the slots 6 situated between said separating ribs 7 have a different length.

In cross section, the separating ribs 7 mainly have the shape of a trapezium. In each long wall of the separating ribs slots 8 are provided so, that the slots 8 in the one long wall of a separating rib 7 are displaced with respect to the slots 8 in the other long wall of this separating rib.

The slots 8 shown in the drawing only extend themselves over a part of the height of the separating rib 7 until the under surface of the plate 1 and they increase in depth from their top side to their under side in such a way, that their inner surfaces each form a part of a surface of revolution.

Figure 5:
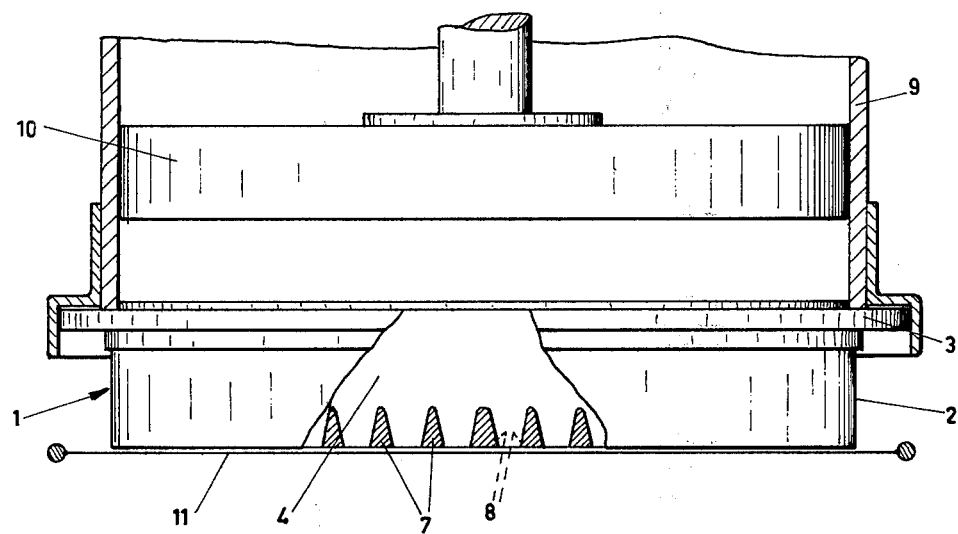
FIG. 5 shows schematically a longitudinal section of a part of an installation for the manufacture of sticks, in which the plate provided with apertures is shown partly in lateral view and partly in cross section.

FIG. 5 shows a part of an installation for the manufacture of sticks from dough material, in which the above-described plate with slots 6 is provided, which plate closed the under end of a cylindrical tank 9, in which the dough material is present. The installation itself is not part of the invention and is known generally in several embodiments, so that it will not be described in detail. In this dough receiving tank there is an intermittently driven piston, which at each intermittent move presses a quantity of dough material through the slots 6 of the plate 1 in the shape of sticks hanging from this plate out of the tank 9. Under the plate 1 there is a cutting means 11, which cuts the stick-shaped parts projecting from the plate, so that sticks are formed which can drop into a receiving tank, which is not shown.

It is obvious that the invention is not restricted to the embodiment, which is shown in the drawing, of the plate, to the subdivision thereof, to the shape of the apertures in this plate or the shape of the separating ribs 7, but that these can have any suitable shape, as the invention consists of separating ribs with slots or the recesses in the walls thereof.

When the sticks are pressed out of the dough receiving tank 9 with their longitudinal direction at a right angle to the plate the plate must be carried out so, that it has apertures with a mainly square shape. The four limiting walls of each aperture in the plate can then be provided each with slots or recesses.

The shape of the cross section of the slots or recesses can also be chosen in numerous different ways. However, the shape of this cross section is preferably chosen, so that they have a cross section which is limited by a curved plane. The slots or recesses can also extend themselves over the entire height of the separating ribs. The shape and the height of the slots or recesses can be chosen in conformity with the composition and the consistency of the dough material.

I claim:

1. A plate provided with apertures separated from each other by separating ribs for a device for the manufacture of so-called sticks from dough material, said plate being destined to be provided at the end of a tank, in said tank, means being provided for pressing the dough material intermittently through the apertures of the plate, means for cutting of the dough material pressed through said plate being provided under said plate, at least two opposite walls of said separating ribs of the apertures having slot-like recesses extending over at least a part of the height of said opposite walls until the under surface of said plate.

2. A plate provided with apertures according to claim 1, in which said separating ribs are tapering from the top side to the under side of the plate, oblong apertures being provided between said separating ribs, said oblong apertures having a length and a width, which correspond to the length and the width of the sticks to be manufactured, the depth of said slot-like recesses in the separating ribs increasing from their upper end to their lower end.

3. A plate according to claim 1 in which the slot-like recesses provided at both sides of each separating ribs being displaced with respect to one another.

4. A plate provided with apertures according to claim 1, in which said separating ribs are tapering from the top side to the under side of the plate, oblong apertures being provided between said separating ribs, said oblong apertures having a length and a width, which correspond to the length and the width of the sticks to be manufactured, the depth of said slot-like recesses in the separating ribs increasing from their upper end to their lower end, the slot-like recesses provided at both sides of each separating ribs being displaced with respect to one another.

5. A plate according to claim 1 in which the slot-like recesses therein having a cross-section limited by a curved plane.

6. A plate provided with oblong apertures for the manufacture of so-called potato sticks, from dough-like material, said apertures having a length and a width corresponding to the length and the width of the sticks to be manufactured and being separated from one another by separating ribs, said separating ribs tapering from the topside to the underside of the plate, said separating ribs being provided at both of their sides with slot-like recesses extending over at least a part of the height of said separating ribs until the under surface of said plate, the slot-like recesses in both of said sides of said separating ribs being displaced with respect to one another and having a cross-section limited by a curved plane.

* * * * *